J. MULLIGAN.
Coffee Roaster.
No. 23,936.
Patented May 10, 1859.
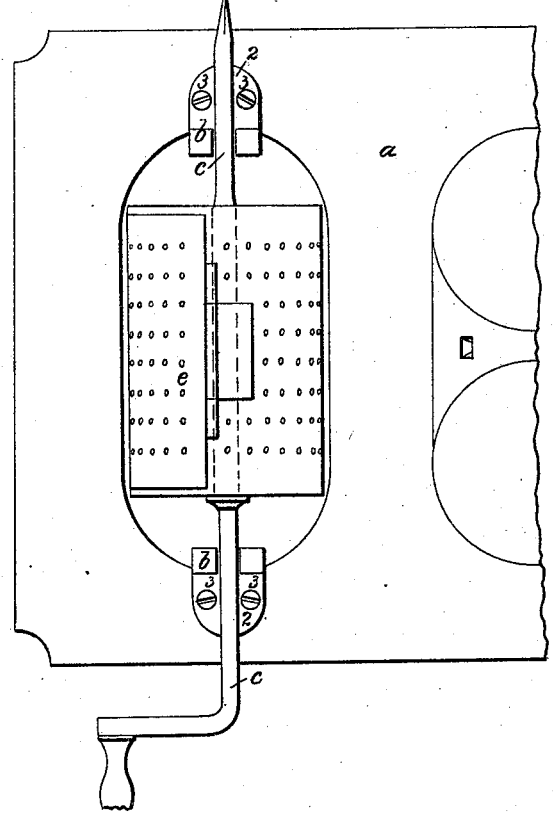
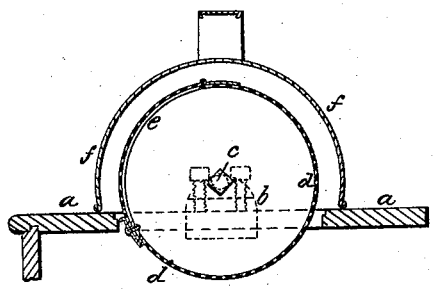
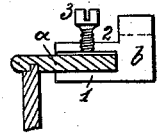
Witnesses:
Lemuel W Serrell
Chas H Smith
Inventor:
James Mulligan

UNITED STATES PATENT OFFICE.

JAMES MULLIGAN, OF NEW YORK, N. Y.

ROASTER.

Specification of Letters Patent No. 23,936, dated May 10, 1859.

*To all whom it may concern:*

Be it known that I, JAMES MULLIGAN, of the city, county, and State of New York, have invented, made, and applied to use a certain new and useful Improvement in Movable Bearings for Coffee-Roasters, &c., to be Applied to the Tops of Stoves or Ranges; and I do hereby declare that the following is a full, clear, and exact description of the construction and operation of the same, reference being had to the annexed drawing, making part of this specification, wherein—

Figure 1, is a plan, and Fig. 2, is a cross section of my movable roaster as in use, and Fig. 3, is a side view of one of my detachable journal bearings in which said roaster revolves.

Similar marks of reference denote the same parts.

Considerable adulteration is practiced in ground coffee, and also in roasted coffee. Beans are often mixed, so that the only security of having a pure article of coffee is to buy the green berries and roast them one's self; a device applicable to common stoves and ranges is much needed for this purpose, by which the housekeeper with but little trouble could roast in a perfect manner the coffee as required for use.

My said invention relates to a peculiar construction of movable journal applicable to the top plate of a stove or range whereby the cylindrical coffee roaster is sustained while being revolved over the open fire. A cover is provided which inclosing said roaster confines all smoke and fumes, passing the same back into the fire.

In the drawing *a*, is the top plate of a stove or range having the usual openings and covers for pots &c. I have shown my roaster as applied to one of these openings.

*b, b,* are two movable journal bearings formed as clamps by the lower jaw 1, and upper jaw 2, through which the binding screws 3, 3, pass, to clamp said journal bearings tightly onto the top plate at the edges of the openings or in any desired position to receive the spit *c*, which is of the necessary length and formed as a crank handle by which said spit is turned and also the perforated roasting cylinder *d*. This spit is formed with a square taking the end of the cylinder *d*, so that the two will rotate together but the spit can be drawn out when desired from the cylinder; *e*, is the opening or flap of said cylinder *d*, *f* is a cover and handle over said cylinder to retain any fumes from the material being roasted, and also serving to keep the heat around the cylinder.

The operation will be apparent without further description, and my said device can be applied to roasting any article besides coffee, to which it may be adapted.

When the roasting is completed, the removal of the cover and cylinder, and the detaching of the journal bearings, *b, b*, by loosening the screws 3, 3, leaves the stove ready for use as before.

I do not claim a movable roaster in itself as this has before been used on stoves, but

What I claim as my invention and desire to secure by Letters Patent is—

The detachable journal bearings *b, b,* constructed as specified so as to be clamped onto the edges of the openings in the stove or range, and receive the spit *c*, for the purposes and as specified.

In witness whereof I have hereunto set my signature this seventeenth day of February 1859.

JAMES MULLIGAN.

Witnesses:
LEMUEL W. SERRELL,
CHAS. H. SMITH.